United States Patent
Kelley

(10) Patent No.: US 8,061,076 B2
(45) Date of Patent: Nov. 22, 2011

(54) PORTABLE LARGE ANIMAL TRAP AND METHOD

(76) Inventor: Harry R. Kelley, Camden, AR (US)

( * ) Notice: Subject to any disclaimer, the term of this patent is extended or adjusted under 35 U.S.C. 154(b) by 344 days.

(21) Appl. No.: 12/234,919

(22) Filed: Sep. 22, 2008

(65) Prior Publication Data

US 2009/0293340 A1    Dec. 3, 2009

Related U.S. Application Data

(60) Provisional application No. 61/056,784, filed on May 28, 2008.

(51) Int. Cl.
*A01M 23/20* (2006.01)
*A01M 23/00* (2006.01)

(52) U.S. Cl. ...................................... 43/61; 43/58; 43/67

(58) Field of Classification Search ................ 43/61, 60, 43/58, 100, 105, 64–67
See application file for complete search history.

(56) References Cited

U.S. PATENT DOCUMENTS

| | | | | |
|---|---|---|---|---|
| 102,761 A * | 5/1870 | Brooks | | 43/63 |
| 366,802 A * | 7/1887 | White | | 43/66 |
| 383,700 A * | 5/1888 | Brusie | | 43/66 |
| 897,396 A * | 9/1908 | Pierce | | 43/65 |
| 1,020,029 A * | 3/1912 | Eccleston | | 43/65 |
| 1,088,988 A * | 3/1914 | Herring | | 43/61 |
| 1,182,018 A * | 5/1916 | Koenig | | 43/61 |
| 1,237,399 A * | 8/1917 | Sloan | | 43/65 |
| 1,287,407 A * | 12/1918 | O'Reilly | | 43/61 |
| 1,363,626 A * | 12/1920 | Thomas | | 43/66 |
| 1,374,014 A * | 4/1921 | Jakubowski | | 43/61 |
| 1,399,518 A * | 12/1921 | Quaritius | | 43/58 |
| 1,438,816 A * | 12/1922 | Fairbanks et al. | | 43/65 |
| 1,491,188 A * | 4/1924 | Berenyi | | 43/61 |
| 1,497,883 A * | 6/1924 | Sosbee | | 43/66 |
| 1,562,397 A * | 11/1925 | Whelchel | | 43/65 |

(Continued)

FOREIGN PATENT DOCUMENTS

EP       910947 A2 *    4/1999

(Continued)

*Primary Examiner* — Darren W Ark
(74) *Attorney, Agent, or Firm* — Berenato & White, LLC

(57) ABSTRACT

A large animal trap (especially for wild hogs) that is easily moved by a single individual and takes only ten minutes to unload and set up and walk away. It is approximately 7½' diameter across the center allowing a trapper to potentially catch a whole herd at once, but overall it is still light enough for a single individual to pick up and roll anywhere owing to its approximately circular drum shape. Overall, the trap includes 750+ welds making the trap exceedingly strong for its weight and size. The trap further includes triple offset walls to help keep all trapped animals in. In use, the trap is firmly secured to the ground by a chain and allows nothing to get out except turkeys which can fly out the escape hole in the top. It is easy, fast and fun to set the trap. A user only needs to tie the rope on the door and set the pins to engage the ground and suspend the door in the open position using the rope. A user then pours corn in and waits until the hogs come into the trap. When the wild hogs or other large animals in the trap root up the pins in the ground, the door drops and locks shut and you keep everything that came into the trap. Nothing gets out unless it flies. It is a fully assembled trap with no assembly required post purchase.

11 Claims, 3 Drawing Sheets

U.S. PATENT DOCUMENTS

| | | | | |
|---|---|---|---|---|
| 1,606,650 | A * | 11/1926 | McIntyre | 43/66 |
| 1,723,208 | A * | 8/1929 | Michael | 43/65 |
| 1,743,036 | A * | 1/1930 | Jetton | 43/65 |
| 1,747,108 | A * | 2/1930 | Evans | 43/61 |
| 1,779,300 | A * | 10/1930 | Weatherly | 43/60 |
| 1,788,047 | A * | 1/1931 | Brunner | 43/66 |
| 1,846,851 | A * | 2/1932 | Dodge | 43/65 |
| 1,936,644 | A * | 11/1933 | Schroder | 43/65 |
| 1,990,861 | A * | 2/1935 | Exum | 43/61 |
| 2,181,551 | A * | 11/1939 | Hayden | 43/61 |
| 2,374,522 | A * | 4/1945 | Andrews | 43/61 |
| 2,454,476 | A * | 11/1948 | Price | 43/60 |
| 2,586,350 | A * | 2/1952 | Lamb | 43/61 |
| 3,596,395 | A * | 8/1971 | Clement et al. | 43/63 |
| 3,688,432 | A * | 9/1972 | Fruits | 43/61 |
| 4,449,316 | A * | 5/1984 | Moorhead | 43/58 |
| 4,468,883 | A * | 9/1984 | Williams | 43/61 |
| 4,583,316 | A * | 4/1986 | Holtgrefe | 43/61 |
| 4,706,406 | A * | 11/1987 | Mowatt et al. | 43/61 |
| 4,779,373 | A * | 10/1988 | Krenson | 43/61 |
| 4,982,525 | A * | 1/1991 | Miller | 43/105 |
| 5,187,893 | A * | 2/1993 | Knight | 43/100 |
| 5,199,210 | A * | 4/1993 | Nastas | 43/61 |
| 5,864,982 | A * | 2/1999 | Tully et al. | 43/61 |
| 5,946,850 | A * | 9/1999 | Sarkisyan | 43/100 |
| 6,003,265 | A * | 12/1999 | Lundgren | 43/61 |
| 6,732,471 | B2 * | 5/2004 | Draper | 43/60 |
| 6,772,555 | B2 * | 8/2004 | Evans et al. | 43/61 |
| 7,313,887 | B2 * | 1/2008 | Hibbs et al. | 43/100 |
| 7,540,109 | B2 * | 6/2009 | Hall | 43/61 |
| 7,610,716 | B2 * | 11/2009 | Philbrook | 43/100 |
| 7,854,088 | B2 * | 12/2010 | Kurachi | 43/61 |
| 2005/0097808 | A1 * | 5/2005 | Vorhies et al. | 43/61 |
| 2006/0112610 | A1 * | 6/2006 | Philbrook | 43/100 |
| 2007/0261292 | A1 * | 11/2007 | December | 43/100 |
| 2010/0018106 | A1 * | 1/2010 | Philbrook | 43/105 |
| 2010/0064572 | A1 * | 3/2010 | Kurachi | 43/61 |

FOREIGN PATENT DOCUMENTS

| | | | | |
|---|---|---|---|---|
| FR | 2666006 | A1 * | 2/1992 | |
| JP | 2000316456 | A * | 11/2000 | |
| JP | 2002218896 | A * | 8/2002 | |
| JP | 2002272351 | A * | 9/2002 | |
| JP | 2002272352 | A * | 9/2002 | |
| JP | 2003134984 | A * | 5/2003 | |
| JP | 2003235434 | A * | 8/2003 | |
| JP | 2004097019 | A * | 4/2004 | |
| JP | 2004305050 | A * | 11/2004 | |
| JP | 2005087072 | A * | 4/2005 | |
| JP | 2005095028 | A * | 4/2005 | |
| JP | 2005168473 | A * | 6/2005 | |
| JP | 2005204674 | A * | 8/2005 | |
| JP | 2006000078 | A * | 1/2006 | |
| JP | 2006136302 | A * | 6/2006 | |
| JP | 2006223165 | A * | 8/2006 | |
| JP | 2006340627 | A * | 12/2006 | |
| JP | 2007037524 | A * | 2/2007 | |
| JP | 2007049904 | A * | 3/2007 | |
| JP | 2007167024 | A * | 7/2007 | |
| JP | 2007300847 | A * | 11/2007 | |
| JP | 2009100696 | A * | 5/2009 | |

* cited by examiner

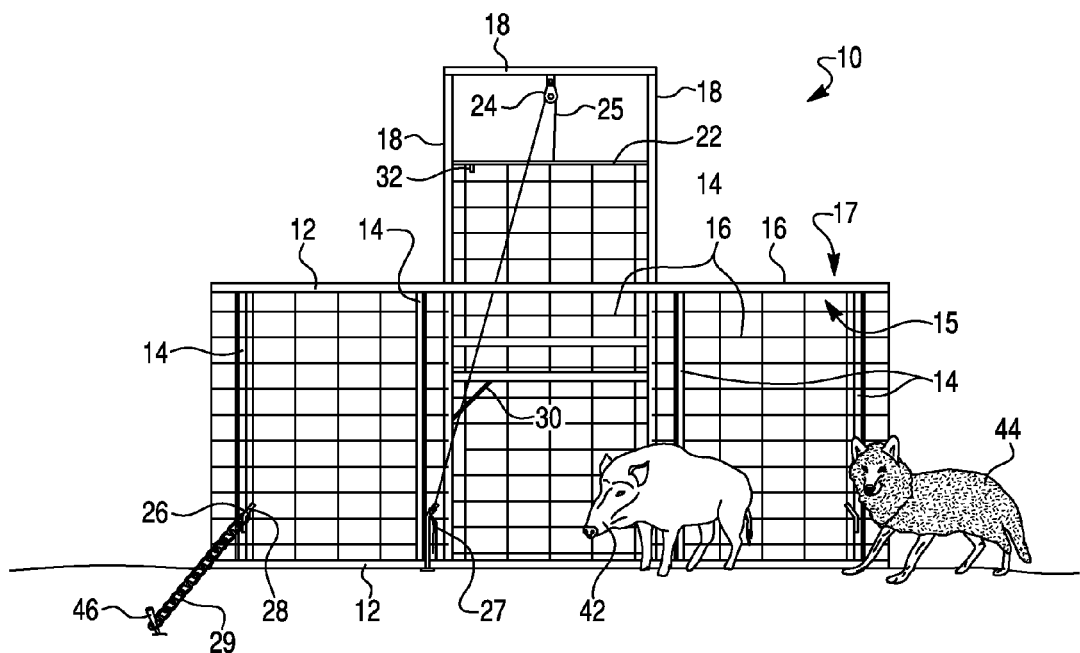

1

PORTABLE LARGE ANIMAL TRAP AND METHOD

This application claims the benefit of U.S. provisional Application No. 61/056,784, filed May 28, 2008.

BACKGROUND OF THE INVENTION

1. Field of the Invention

The invention relates generally to a one-person operable large animal trap. Specifically, the invention relates to an especially portable/maneuverable wild hog catching trap and method of using the trap.

2. Background

There is a need in the industry for a trap that can be operated by one person, man or woman of moderate physical capacity, in order to be able to trick a hog and catch it in a safe sturdy trap.

Most trappers use square traps requiring two or more people to manhandle. These traps need significant leg and back strength to move owing to their weight and awkwardness. In addition, you can only mostly truck these traps in to a spot close to a road. This is a significant disadvantage since in many cases hogs are in the bottom of valleys, away from road edges, feeding. If you want to trap them, you have to go to them. A further disadvantage of existing traps is that the longer the overall length of a traps, the more likely a hog can run and crash into the end of the trap. This can severely injure the trapped animal and damage the trap.

Most existing traps are square in shape and are just simply put together with only one wall and very little pre work. These animals are super strong in the wild so you have to be prepared for the unexpected owing to their desire to be free. Traps must be much stronger, especially if the whole herd is all caught at once. Some trap builders require you to fit and weld additional elements together to augment the strength of the traps.

Many of the existing traps are also home-made traps having only light walls, if any. For example, one wall might be only a wire panel without any sort of reinforcing. The disadvantage of this type of trap is that if a hog hits a one wall trap, it will almost tear off its bottom jaw, severely hurting itself in the process. There is often not much time spent in the construction of known traps. Corners are cut to keep costs down. Most trappers are looking for cheap and easy and are not concerned with strength and safety.

SUMMARY OF THE INVENTION

The present invention provides a trap having an approximately round design which enables one person to operate the trap alone. It replaces the current square or rectangular traps which are not only difficult to transport but which also can hurt the trappers' backs or legs. The hog catching trap of the present invention can be turned over onto an edge and rolled anywhere. When you arrive at the spot where you want to place the trap, simply turn it back over and set it back up.

The present invention also provides a trap having offset triple walls. The third wall is called a "Baby Stopper", allowing nothing to get out. The present invention further provides an opening in the top of the trap. It is a Federal Offense to bait a trap in the woods using corn without an escape route for turkeys. Many States are now complying with this requirement. The trap of the present invention has no bottom, instead using the ground itself as a lure. The natural environment, such as the ground, also helps trick the hogs into the trap since they root on the ground anyway.

The present invention is also unique in that it uses the animals' natural tendencies. Chaining the trap down makes it all but impossible for the trap to be lifted up by the caught animal, or for the trapped animal to root out. The locking device on the door keeps all animals in so that they can't root up the door. It is a one-person trapping operation and it is a one piece unit with no assembly required by the purchaser.

The size of the trap is extremely important in relation to the animals desired to be trapped, so that potentially the whole herd can be caught. It is not too big and not too small. The trap is approximately round in shape making it easy to move. Moving it is not time-consuming or painful and it can be a one person operation. The trap can be rolled anywhere and it takes just 10 minutes to unload it, set it up, bait it and secure it to the ground. Once caught the animals are mad. The triple offset walls provide safety from harm and the locking device on the door keeps the hogs from escaping. It is a great trap for hogs of all sizes. It is already put together and is a one piece unit.

The hog catching trap of the present invention is of optimum size. It is not too small to catch a lot, yet not too big to require a permit to haul down the highway. It is light enough so that almost anyone can pick it up and roll it, and strong enough to withstand any hog that can fit through the door. It is easy, fast and fun, and it works.

The present invention is affordable for everyone. In comparison to Hunting: Hunting leases, $300; 4 Wheelers, $3000; Gun, $400; Clothes, $200; Shells, and calls and misc. $200. Total: over $4000 just to go into the woods and try to get wild game and meat and with no real assurance of success. The trap made in accord with this invention is under $1000; and, it works. It not only catches but also holds anything that enters. Fresh wild game meat anytime you need some, guaranteed.

Finally, it is an object of the present invention to provide a large animal catching trap that does not suffer from any of the problems or deficiencies associated with prior solutions.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

FIG. 4 is a front view of the invention 10 showing a wild hog 42 or coyote 44 ready to enter the trap.

DETAILED DESCRIPTION OF THE INVENTION

Figure 1:
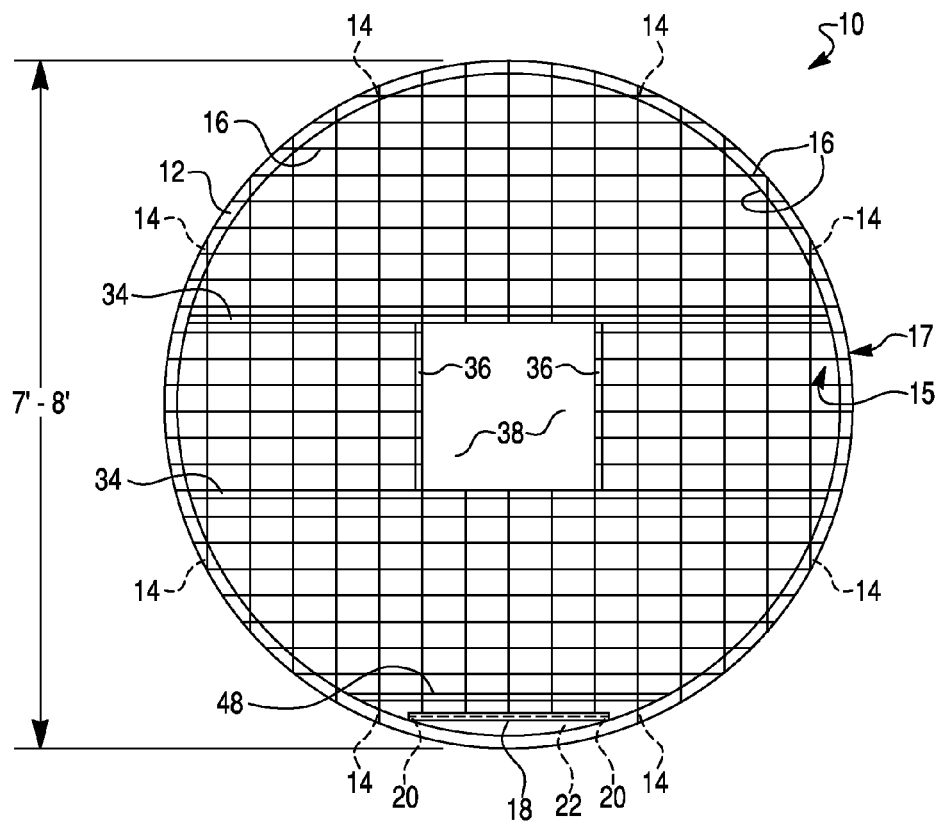
FIG. 1 is a top plan view of the invention 10.
Figure 2:
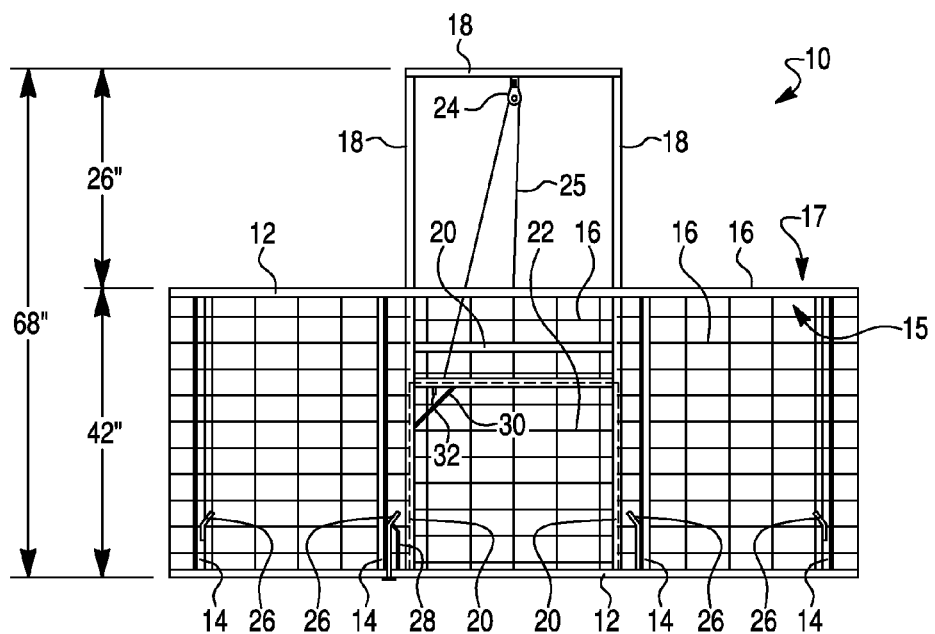
FIG. 2 is a front view of the invention 10.

The present invention is directed to a large animal (hog) catching trap 10. The frame work of the trap can be generally made of weldable 1¼ inch square tubing. The top and bottom ring elements 12 and connecting elements 14 are made from similar tubing and are welded together to form an integral whole drum shaped welded frame. The respective rings 12 are created initially by bending/rolling/cutting the tubing to create a pair of 7-8 foot diameter matching rings or hoops. This process is followed by cutting 40 inch lengths of tubing (approximately 10) and welding them at relatively equal spacing around the rings to create the overall drum shape of the frame. Angle iron 18 is then cut and welded to form the upright door tracks, followed by cutting of some ¼-⅜ inch or so bar stock to create the actual door itself 22 and sized (18-24 inches or so wide) to fit within the space provided between tracks 18. The door tracks 18 are braced and supported by tubing 20. The door 22 rides in the door tracks and is pulled open by a rope 25 strung through a pulley 24 and held in position, once the trap 10 is set, by stakes 28 engaging the ground. When the door closes, it is held closed until latch 32, mounted on frame element 30, is released by the user. Additional framing is provided on the top portion of the trap 36, 34, so as to support the cattle panel mesh 16 mounted on top and also to define a turkey escape hole 38 (about 24 inches across). The cattle panel mesh 16 is preferably welded to both the exterior 17 and the interior 15 of the framing on the top and encircling sidewall and door. Hence, the 3 offset wall construction: 1st and 2nd layers of cattle panel with an in between reinforcing frame work of tubing. Additional lugs 26 (tie down supports) are welded around the perimeter on the respective uprights 14, the lugs 26 both have axes which are transverse to the respective uprights 14 and extend upwardly toward the top ring element 12 from the lugs 26 at locations between the top and bottom ring elements 12. These are used to engage securing elements, preferably chain lengths 29, held in place by chain stakes 28 to secure the trap to the ground 46 when the trap 10 is set and in use.

Figure 3:
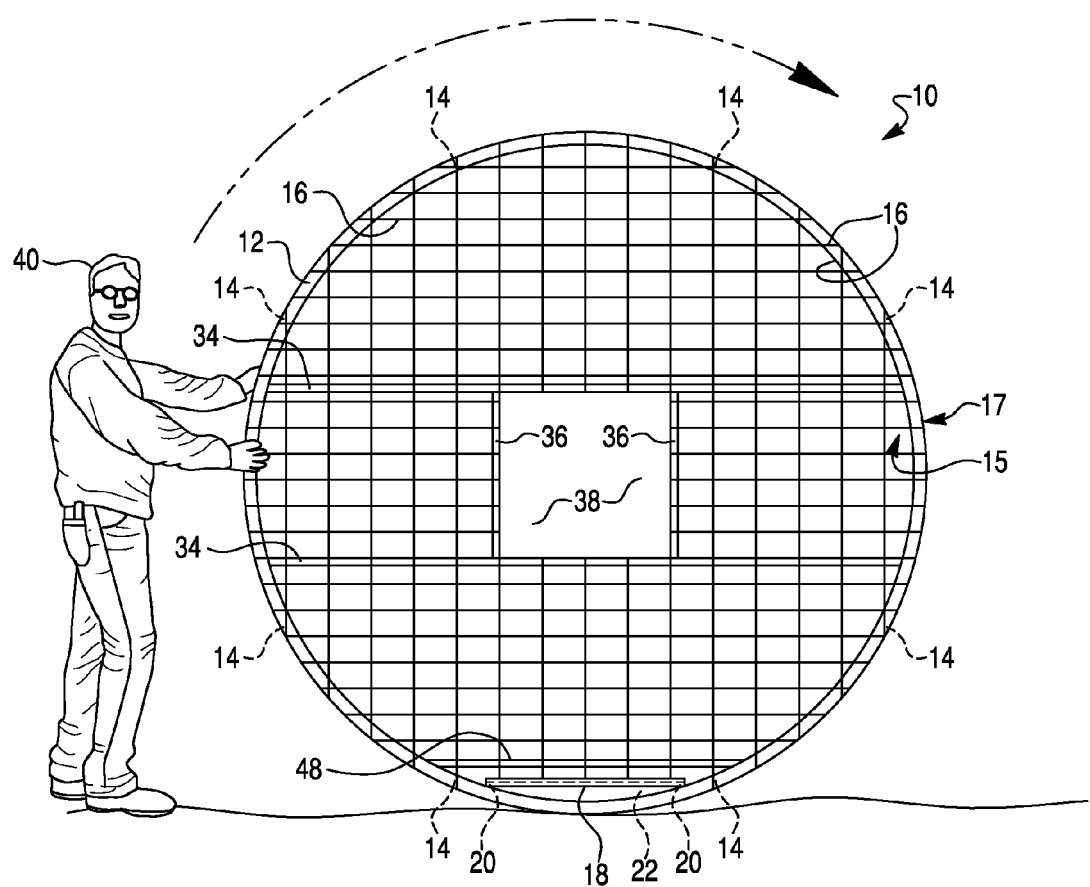
FIG. 3 is an elevation view of the invention 10 being moved by a user 40 according to the method.

As shown in FIG. 3, the trap is easily moved by one person of moderate physical capacity owing to the fact that it can be lifted onto its side and rolled about. The relatively large, but not too large, size of the circle enables easy rolling over rough terrain and also enables its placement and removal from a standard pick-up bed height transporting vehicle or trailer. The size of the rings and height of the trap can vary somewhat in accord with the size and strength of the animal sought to be trapped. A smaller portable round trap could be in the range of 3-4 feet in diameter and no taller than 18 inches or so. The largest trap that could be reasonably transported and handled by a single individual would be in the 8-9 foot diameter range and 4 feet tall. And, while a perfect ring or hoop shape is preferred, an approximate ring or hoop (i.e., octagonal shape, slight oval, or egg shape), would also work, it would simply be somewhat more difficult to roll owing to its non-curvilinear or non-ideally circular shape respectively. The larger traps (5 foot diameter and up) are rolled on their edge onto a transport vehicle and secured in that manner for transport. Smaller traps can be laid flat for transport.

The turkey escape hole 38 may be blocked as desired when trapping for coyotes or in instances where turkeys (or other foul) are not anticipated or present. This blocking can be done with a suitably sized and framed door or by a wired in place (but removable if necessary) cover of cattle panel wire.

To set the trap: a user first drives as near to the eventual trap location as is reasonable. The trap is removed from the transport vehicle and rolled to the pre-selected trap site. The trap is set upright so mat the open bottom is closed by the ground. The trap is secured to the ground as necessary with chain lengths 29 and chain and ground engaging stakes 28. The door is held open by a length of rope 25 slung over pulley 24 and held by a ground engaging stake 27 inside the trap. Corn (or other lure food) is spread within the trap. When an animal (hog 42) (coyote 44) enters the trap, their activity within the trap disturbs the stake 27 holding the free end of the rope 25 which, therefore, releases. The door 22 falls into a lowered position and is latched closed by latch 32. Animals are trapped until released by the trapper.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:
1. A large rigid ground engaging animal trap, comprising:
respective upper and lower metallic ring shaped elements rigidly and strongly connected one to the other by intermediate uprights at spaced intervals around peripheries of said ring shaped elements so as to form an integral drum shaped frame defining an interior and an exterior, a top and a bottom rim, and a side between said to and bottom rim, said ring shaped elements being comprised of a metal suitable for trapping and retaining wild hogs;
a door also connected between said ring shaped elements creating an opening through a curved portion of said side of said drum shaped frame, said door being capable of being moved between a first open and a second closed position, said movement to said closed position being accomplished by a weight of the door when said trap is in use;
heavy wire mesh strongly attached, so as to resist the escape of a wild hog, to an entire exterior of said side and said top of said drum shaped frame and said door, leaving said bottom rim of said drum shaped frame open, said lower metallic ring being devoid of any mesh extending across a diameter thereof so as to define a bottom opening within said bottom rim which is completely open, wherein said doorway provides exclusive ground level entrance and exit passage from said interior of said trap when said trap engages the ground thereby closing off said open bottom;
several of said intermediate uprights further include engaging lugs which both have axes that are transverse to said intermediate uprights and extend upwardly toward the upper metallic ring shaped element from said intermediate uprights at locations between the upper and lower metallic ring shaped elements, said engaging lugs engaging trap securing elements, said securing elements holding said trap in a fixed position against the ground when in use wherein said securing elements are themselves fastened to the ground and resist the impacts from attempted animal escape.
2. A trap as in claim 1, wherein:
said top of said drum further includes an other opening in said mesh sized to function as an escape for inadvertently trapped flying animals.
3. A trap as in claim 2, wherein:
said other opening further includes a closure panel for selectively closing said other opening.
4. A trap as in claim 2, further comprising:
a second covering of heavy wire mesh strongly attached to an entire interior of said side and top of said drum shaped frame, leaving only said bottom opening defined within said bottom rim uncovered.
5. A trap as in claim 4, wherein:
said second covering of heavy wire mesh is sufficient in strength to resist cattle.

6. A trap as in claim 1, wherein:
said door is a sliding door guided by guide elements connected between said upper and lower ring shaped elements and further including a brace element connected between upper ends of said guide elements.

7. A trap as in claim 6, further comprising a ground engaging stake wherein:
in use, said door is held in an open position by a rope having one end attached to said door and an intermediate portion slung over a pulley mounted on said brace element and a free end held against the ground by said ground engaging stake, whereupon, when said free end is released by animal rooting activity within said trap, said door closes.

8. A trap as in claim 7, wherein:
said guide elements further include latching means for retaining said door in said closed and a latched position.

9. A trap as in claim 1, wherein:
said ring shaped elements are approximately circular and their overall diameters are between 3 and 9 feet and said uprights are between 18 and 50 inches in length.

10. A trap as in claim 1, wherein:
said securing elements comprises lengths of chain.

11. A method of trapping large animals, comprising the steps of:

selecting a suitable site for trapping a predetermined type of animal;
providing and unloading the large rigid ground engaging animal trap of claim 1 from a transport vehicle;
tipping said trap onto said curved portion of said side and rolling said drum shaped frame to said suitable site;
orienting said trap to an upright position wherein the ground closed off said bottom opening of said trap;
staking said trap to the ground using said securing elements comprising lengths of chain in combination with first ground engaging stakes to engage said lengths of chain on said engaging lugs on several of said intermediate uprights of said trap and securing said chain lengths to said stakes;
securing said door into interior of said drum shaped frame in said open position using a length of rope to secure said door with a free end of said rope secured against the ground using a second ground engaging stake driven into the ground interiorly of said trap; and
spreading food lure onto the ground inside said trap; trapping a large animal when said animal loosens said free end of said rope from said second stake, allowing said door to close to the closed position, thereby trapping said animal in a confined interior space of said trap.

* * * * *